United States Patent Office 2,900,632
Patented Aug. 18, 1959

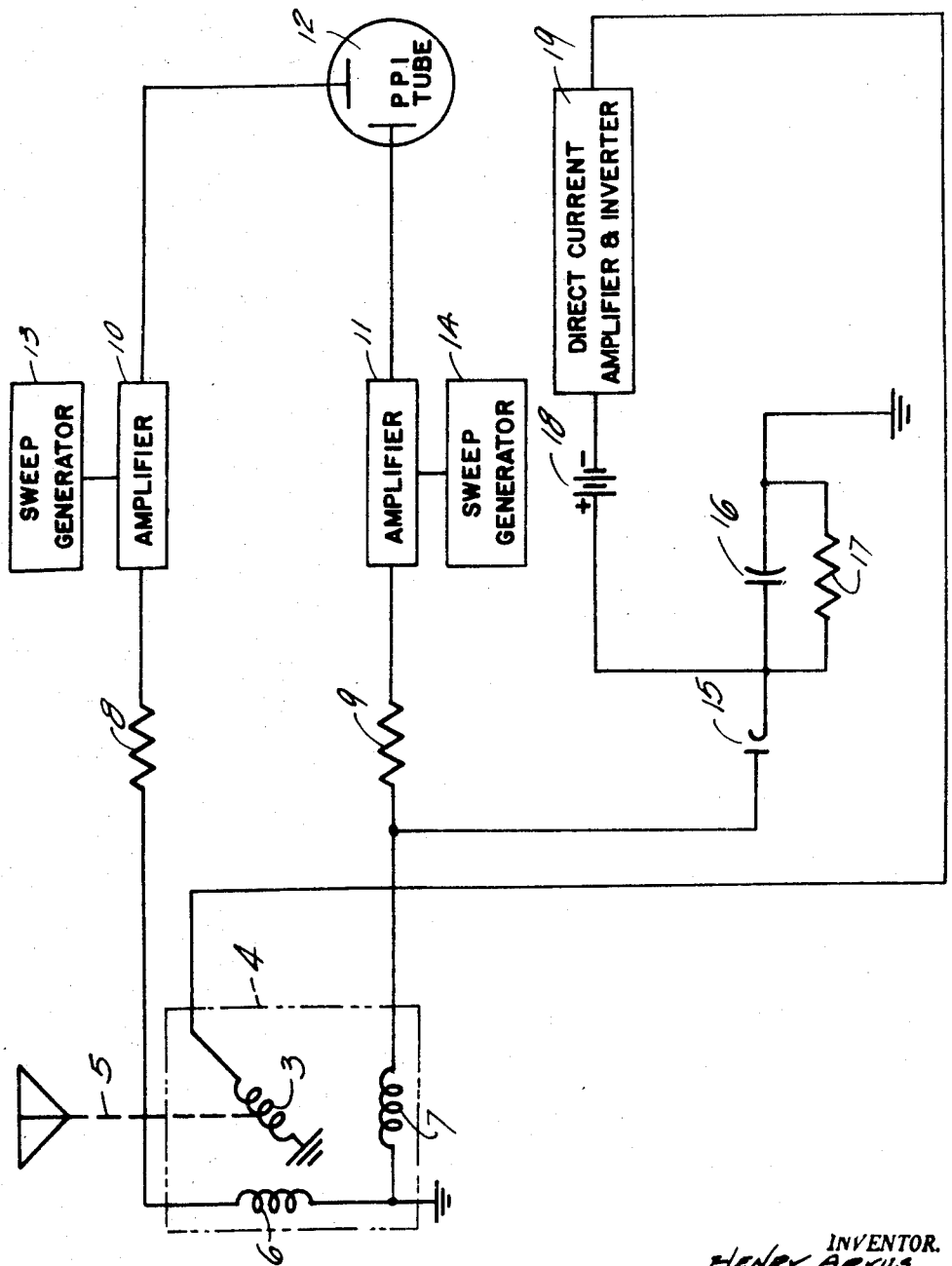

2,900,632

PLAN-POSITION INDICATOR SYSTEM

Henry Arkus, Brooklyn, N.Y., assignor to the United States of America as represented by the Secretary of the Navy Original application January 12, 1955, Serial No. 481,501. Divided and this application January 30, 1956, Serial No. 562,357

2 Claims. (Cl. 343—10)

This patent application is a division of a copending application entitled Plan-Position Indicator System, Serial No. 481,501 filed by Henry Arkus on January 12, 1955.

The present invention relates to a novel and improved electron deflection apparatus for the cathode ray display tube of a radar system and more particularly to apparatus for developing a rotary sweep voltage for the deflection plates of a cathode ray display tube wherein the quadrature voltages that ultimately produce the sweep voltage are substantially uniform in amplitude and wherein the sweep voltage is kept in accurate synchronism with rotation of the antenna of the radar system.

In various commercial and military applications of radar, it is often necessary and desirable to accurately determine the azimuth direction of objects about a predetermined point. The plan position indication or P.P.I. system affords perhaps the best known and most practical method of providing information of this type. In accordance with this system, a pair of quadrature sinusoidal voltages are developed as the highly directional antenna of the radar system is rotated at a predetermined constant rate about the 360 degree search sector. These voltages are then used to produce a rotary or circular sweep affect upon the stream of electrons in the display tube. In this system, it is essential, however, that the sweep effect which is developed and which emanates at the center of the face of the tube and successively sweeps outwardly therefrom about its circumference be kept in accurate synchronism with the instantaneous directional position of the antenna at all times. It is also essential that the amplitude of the quadrature voltages that are developed be maintained substantially constant at all times. Although various sweep generating and electron deflection circuits have been devised heretofore for use in a P.P.I. system, considerable difficulty has been experienced in the past in providing suitable apparatus which satisfies these requirements of the system in a practical and effective way.

It is a principal object of the present invention to provide novel and improved electron deflection apparatus for a radar system.

It is a further object of the present invention to provide novel and improved rotary sweep voltage apparatus for the deflection plates of a cathode ray display tube wherein the component quadrature voltages which ultimately produce the sweep are substantially uniform in amplitude.

It is a further object of the present invention to provide novel and improved rotary sweep voltage apparatus for the deflection plates of a cathode ray display tube wherein the sweep is constantly kept in accurate synchronism with rotation of the radar antenna.

Other objects and many of the attendant advantages of this invention will be readily appreciated as the same becomes better understood by reference to the following detailed description when considered in connection with the accompanying drawings wherein:

In the drawing which is illustrative of the invention:

The figure is a circuit diagram of a preferred embodiment of the invention.

One preferred embodiment of the present invention is illustrated in the figure of the drawing. As shown therein, the armature winding 3 of the two phase generator 4 is positioned in any suitable manner on the radar antenna assembly 5 and rotates with it as it sweeps the 360 degree search area in the azimuth plane. The stationary quadrature field coils 6 and 7 of the generator 4 are preferably electrically connected as shown in the drawing respectively through the charging resistors 8 and 9 and the amplifiers 10 and 11 to the horizontal and vertical deflection plates of the cathode ray display tube 12 where as will be more apparent hereinafter the desired rotary sweep effect is produced. The junction of coils 6 and 7 is connected to ground as shown.

The sweep generators 13 and 14 which are of any suitable conventional design vary the output of the amplifiers 10 and 11 between zero and preselected maximum values. In this way, as will be more apparent hereinafter, a rotating sweep rather than a circular sweep is developed on the deflection plates of the tube.

Inasmuch as the sweep generators and their associated circuits may take a variety of different forms and inasmuch as the particular structural details thereof by themselves form no part of the present invention, a full and detailed description of the same is omitted for the sake of simplicity. For the purposes of the present invention, it need only be understood that the sweep generators 13 and 14 generate sawtooth voltages which have repetition rates or frequencies that are high compared to the frequency of the quadrature sine wave outputs of generator 4.

The output of the field coil 7 of generator 4 is also electrically connected to ground through a series circuit which includes the diode 15 and the condenser 16. Resistor 17 is preferably connected as shown in parallel with condenser 16. As will be more apparent hereinafter, the diode 15, condenser 16, and resistor 17 form an effective peak voltage detector circuit for the sine wave output of the field coil.

Although in the drawing the voltage detector circuit is shown connected to the field coil 7 of generator 4, it is to be understood that the said circuit could be coupled to the other field coil of the generator without departing from the spirit or scope of the present invention.

The junction of the diode 15 and the condenser 16 is also electrically connected to the ground as shown through the fixed reference voltage source 18, the conventional D.C. amplifier and inverter circuit 19 and the armature 3 of the generator 4. As will be more apparent hereinafter, this circuit develops a current through the armature of the generator which is dependent upon the difference in potential of the charge across condenser 16 and the reference voltage 18 and which effectively eliminates variations in the amplitude of the quadrature sine wave output voltages of generator 4.

In operation the armature 3 of generator 4 rotates with the antenna 5 of the radar system and therefore unavoidably maintains the quadrature sine wave output voltages and the ultimate above described rotating sweep voltage across the deflection plates of the display tube 12 in the desired condition of synchronism with the antenna. The circuit between field coil 7 of generator 4 which includes in series condenser 16 and diode 15 develops a voltage across condenser 16 that is indicative of the peak voltage of the sine wave output of the field coil. This voltage across condenser 16 is then compared with the fixed voltage of the series reference source 18. The difference or error voltage which is obtained is then amplified and inverted by conventional apparatus and fed back to the field coil 3, where the field current therein is automatically regulated and adjusted to reduce the error voltage and assure quadrature sine waves of constant amplitude.

Obviously many modifications and variations of the present invention are possible in the light of the above teachings. It is therefore to be understood that within the scope of the appended claims the invention may be practiced otherwise than as specifically described.

What is claimed is:

1. Electron deflection apparatus for a radar system having a rotating antenna and a cathode ray display tube, said apparatus comprising; a two phase generator having a pair of stationary coils and an armature coil that rotates with the antenna; a sweep generator responsive to the output of each stationary coil for controlling the potential across each pair of deflection plates of the tube; a diode element; a condenser; a circuit including the diode and the condenser in series between one of the field coils and ground; a D.C. reference voltage source; a D.C. amplifier inverter; and a circuit including the reference voltage source and the amplifier inverter in series between the junction of the diode element and the condenser and the said armature coil.

2. In electron deflection apparatus for a radar system having an antenna that scans the azimuth plane at a predetermined rate, apparatus for developing substantially constant amplitude quadrature voltages that are synchronized with movement of the antenna comprising; a two phase generator having a pair of stationary coils and an armature coil coupled to the antenna for rotation therewith; a diode element; a condenser; a circuit including the diode and the condenser in series between one of the stationary coils and ground; a D.C. reference voltage source; a D.C. amplifier inverter; and a circuit including the reference voltage source and the amplifier inverter in series between the junction of the diode element and the condenser and the said armature coil.

References Cited in the file of this patent

UNITED STATES PATENTS

| | | |
|---|---|---|
| 2,149,697 | Holst | Mar. 7, 1939 |
| 2,727,224 | Adkins | Dec. 13, 1955 |